Patented July 27, 1948

2,445,970

UNITED STATES PATENT OFFICE 2,445,970

METHOD FOR POLYMERIZING

Robert C. Reinhardt, Midland, Mich., assignor to The Dow Chemical Company, Midland, Mich., a corporation of Delaware No Drawing. Application July 21, 1944,
Serial No. 546,051

2 Claims. (Cl. 260—83)

This invention relates to a method for the polymerization of monomeric substances in water suspension to form solid polymers and particularly to the polymerization of monomeric vinylidene chloride, either alone or mixed with other monomeric substances polymerizable therewith. The word suspension is used herein to refer to those suspensions of macro particles which are maintained by agitation or by a certain degree of agitation supplemented by suspension stabilizers, e. g. methyl cellulose. The use of surface active agents, i. e. emulsifiers, is not contemplated in the process of the invention.

The polymerization of liquid polymerizable substances such as vinylidene chloride, vinyl chloride, styrene, vinyl acetate, vinyl butyrate, acrylic esters, acrylonitrile, and mixtures thereof in water suspension to provide a granular product uniform in composition and particle size and suitable for use directly in molding, extrusion, and other plastic working apparatus, is desirable for a number of reasons. No costly polymerization medium is required, no impurities, such as emulsifiers or organic solvents, are contained in the product; no products other than the polymer itself and any unpolymerized monomer need be recovered; and if a product of sufficiently uniform particle size be obtained it need not be reworked prior to use in further plastic working operations.

The carrying out of such polymerizations in water suspension has, however, not been practical in most instances. The general method of carrying out such polymerizations has been to load the water and monomer or monomers together, usually, with a catalyst into a reaction vessel fitted with an agitator and agitate the mixture vigorously throughout the polymerization period. During the intermediate stages of the polymerization the polymer formed will, if it is soluble in the monomer, gradually thicken the latter to produce a more and more viscous solution or, if it is insoluble in the monomer, it will form therewith a pasty, viscous mass. In either case difficulty is encountered due to the very sticky and agglomerative nature of the mixture of polymerized and unpolymerized material which adheres to agitators and vessel walls, coalesces into large lumps, and, in general, offers many difficulties in the way of maintaining a satisfactory suspension. Increasing the degree of agitation does not solve the problem because, as the lumps or particles harden due to the progress of the polymerization, they are thrown violently together and ground to a fine powder which is, upon recovery and drying, not well adapted for use directly as feed for most plastic working machines. Thus if vigorous agitation is maintained, the product is too fine, while if less vigorous agitation is maintained, large lumps are likely to be formed which are not broken up. At best, the particles of product will be non-uniform in size. Changing the degree of agitation as the polymerization progresses does not produce the desired results because the mixture may at the same time contain lumps of almost completely polymerized material and lumps in which the degree of polymerization is much less.

The polymerization of vinylidene chloride, either alone or mixed with other substances polymerizable therewith, presents these and certain other difficulties not heretofore mentioned. The polymer is not soluble in monomeric vinylidene chloride and precipitates as it is formed. Water-immiscible substances are, therefore, present throughout the entire polymerization period, and, since the polymer is insoluble both in the monomer and in the water, the water-immiscible substances vary in consistency during the course of the reaction from a liquid through a viscous sticky semi-liquid state, which gradually becomes more viscous, to a hard granular form. The polymerization as heretofore carried out in water suspension has produced only particles non-uniform in size and non-uniform in chemical composition. The use of very vigorous agitation which is necessary to keep the sticky masses dispersed is undesirable, since it exerts a grinding action on the hardened particles and leads to the formation of a substantial proportion of powdered material in the final product, the remainder being in the form of hard lumps of assorted sizes. Because of the exothermic nature of the polymerization reaction and the low heat conductivity of the product, the formation of large particles or lumps at any time during the course of the process is undesirable, since the temperature of the material undergoing polymerization in the interior of such large particles will increase unduly. Such an increase in temperature causes a decrease in the polymer chain length with a resultant chemical non-uniformity or non-homogeneity of the product, and, if excessive, produces an unstable polymer product. Further, polymerization will proceed at an unequal rate in lumps or masses of unequal size and temperature and the mixture contains, at the same time, masses of hard substantially completely polymerized material and masses which are much less highly polymerized. Such non-uniformity prevents using at any particular stage in the process polymerizing conditions which are optimum for more than a fraction of the particles at that stage. The non-uniformity of chemical composition of the product is serious in that it prevents the standardization of subsequent fabrication processes.

It is, therefore, an object of the present invention to provide a method for polymerizing a monomeric substance in aqueous suspension to produce a solid polymer.

An additional object is to provide a continuous method whereby a polymerizable substance may be polymerized in water suspension to produce a solid polymeric product of substantial uniformity of particle size and chemical composition.

An additional object is to provide a method whereby the polymerization of a substance selected from the class consisting of vinylidene chloride and mixtures of vinylidene chloride with compounds polymerizable therewith may be carried out in water suspension to provide a polymeric substance having a high degree of uniformity of particle size and chemical composition.

An additional object is to provide a continuous method for the polymerization in water suspension of a substance selected from the class consisting of vinylidene chloride and mixtures of vinylidene chloride with compounds polymerizable therewith to produce a polymeric substance of a high degree of uniformity.

These and related objects are accomplished readily by carrying out the polymerization in a series of three successive reaction zones, in each of which the reaction conditions are controlled independently so as to maintain the optimum polymerizing conditions for the mixture in that zone. These zones are defined by the physical properties of the polymerizing mixture. In the first or initial zone, the monomer or mixture of monomers, as the case may be, is suspended by means of mechanical agitation in the polymerization medium, i. e. in water, and the initial stages of the polymerization reaction carried out. Usually the polymerizable material and water, together with a catalyst, are fed continuously into the first zone, either separately or after premixing.

Certain other substances, such as methyl cellulose and a number of natural gums, which facilitate maintaining mechanical suspension of the monomer, but which have little or no emulsifying action may also be included if desired. Also in certain instances the use of buffers to control the pH of the mixture or of substances to otherwise modify the polymerization conditions may be desirable. In most instances, the polymerization is not carried sufficiently far in the first zone to cause separation of appreciable amounts of the solid polymeric material or substantial thickening of the suspended monomers.

The tendency of the polymerizing mixture to form into sticky lumps is apparent in the second or intermediate zone where the reaction conditions, particularly the degree of agitation, are so controlled as to maintain the sticky intermediate product in the desired degree of subdivision. In the third or final zone, the separate particles of polymer are usually hard and not inclined to be sticky and may, after withdrawal from the final zone, be separated readily from the polymerization medium by filtration or in any other convenient manner. The degree of agitation in the final zone may usually be considerably less than in the intermediate zone. The rate of feed of material from one reaction zone to the next succeeding zone is usually small compared to the total amount of reaction in either zone, the actual rate being dependent upon a number of factors including the particular monomer or monomers being polymerized, the temperature, the rate of polymerization, the degree of polymerization desired, and the catalyst used.

Each of the three zones may be subdivided further if desired and the process of each zone carried out in a number of reaction vessels or cells to secure additional advantages. This, however, does not alter the definition of the zones.

By separating the zones of the polymerization so that each zone may be carried out in a separate reaction unit, such as one or more kettles or coils, in which the reaction conditions, particularly the degree of agitation employed, may be adapted to the consistency of the reacting mixture in each unit, complete control of the reaction may be had at all times. In the first of the reaction zones, for example, where there is usually little or no separation of a solid polymer, it is merely necessary to maintain sufficient agitation to insure thorough mixing of the monomers with the medium.

In the intermediate zone, the greatest tendency of the polymerizing mixture to form into soft sticky masses is encountered and in this zone the agitation and other reaction conditions are adapted to maintain a uniform suspension of such sticky material throughout the reaction medium without the formation of large lumps. Usually very vigorous agitation is required in the case of exothermic polymerizations to keep the sticky masses divided so that undue heating will not occur.

The final reaction zone is characterized by the presence therein of the insoluble polymer suspended in the form of hard non-sticky granules. These granules may contain a considerable amount, in some instances up to as much as 40 to 80 per cent, of unpolymerized monomer, but not enough to cause them to be sticky. Such contained monomer will, of course, polymerize if the mixture is maintained under polymerizing conditions sufficiently long and it is usually desirable to effect such polymerization as completely as possible. It is, however, not desirable to agitate the suspension of hard granules vigorously or over a period of time long enough to grind them to too fine a powder for the reasons mentioned previously.

In addition to controlling the agitation separately in each of the reaction zones, it is also desirable to control other factors such as the temperature or the pressure. In certain instances, also, it may be desirable to add certain substances, such as catalysts or other modifiers, to a reaction zone subsequent to the initial zone. Also, in some instances, it may be desirable to separate portions of the reaction mass such as vapors, settled solids, etc., from certain of the zones prior to the final zone. These various modifications are contemplated by the invention.

The polymerization reaction may be carried out according to the method of the present invention in a number of ways. For example, a series of reaction vessels or coils may be employed and the polymerization mixture run slowly through them in succession, the rate of flow being so adjusted that most of the polymerizing mixture in each vessel is of the same approximate degree of polymerization and consequently of substantially the same physical properties. The several reaction vessels may advantageously be further subdivided into smaller zones or compartments, if desired, to further segregate the polymerizing mixture into separate portions of even more nearly identical properties and degree of polymerization throughout. If desired, vessels of different sizes may be used so that any particular portion of the polymerizing mixture will remain in a certain reaction zone for a length of time different from the length of time it remains in any other reaction zone. This may be particularly desirable when the changes in the physical properties of the polymerizing mixture are either rapid or slow compared to the rate of polymerization. In the first instance, it may be desirable to pass the polymerization mixture fairly rapidly through certain of the zones. On the other hand, when the granules have substantially hardened and only very little further physical change occurs, the mixture may be maintained in the same reaction zone for a much longer time.

In a specific instance vinylidene chloride containing 1 per cent benzoyl peroxide as a catalyst is fed continuously at the rate of 250 grams per hour, together with water at the rate of 300 grams per hour, through a series of three tumblers, each rotating on its longitudinal axis. The overflow from the first and second tumblers constitutes the feed for the second and third tumblers, respectively, the overflow from the third tumbler being collected and filtered to recover the polyvinylidene chloride produced. The first tumbler is divided into two cells, each about 8 inches in diameter and 12 inches long, by means of a transverse diaphragm having a small hole in its center to allow overflow from one cell to the next. In a similar manner, the second tumbler is divided into two cells and the third tumbler into six cells of about the same size as those of the first tumbler, each of the several cells in the three tumblers being fitted with baffles for agitating the polymerizing mixture. The apparatus is immersed in a water bath maintained at 25° C. The first tumbler is rotated at a peripheral speed of from 500 to 800 feet per minute, the second at a peripheral speed of from 800 to 1200 feet per minute, and the third at a peripheral speed of from 200 to 500 feet per minute. Very little separation of polymer takes place in the first tumbler, while in the second tumbler the water insoluble material becomes quite sticky and viscous. In the third tumbler the particles are hard and self-sustaining and show no tendency to coalesce into larger lumps. The product obtained is sufficiently uniform as to particle size so that after drying it can be used directly as feed for a plastic extrusion machine.

It is apparent that the degree of agitation used in each particular reaction zone will depend not only upon the consistency of the water insoluble portion of the mixture in the particular zone, but upon the ratio of the amount of such insoluble material to the amount of water in the zone. The design of the agitating equipment, e. g. whether stationary reactors with rotating propellers or rotating tumblers with inside baffles, etc., will depend largely upon the particular polymerization reaction involved. For any particular reaction and any particular type of reactor there will be an optimum speed of the agitating equipment in each zone which will give the desired optimum results as to uniformity and size of the particles of product and uniformity of their chemical composition. It is apparent that it is impossible to describe simply the type and degree of agitation applicable to all types of reactors and all polymerization reactions, and that for any specific polymerization the optimum degree of agitation for the equipment involved may be determined by simple test.

Although the invention has been particularly described with particular reference to the polymerization of vinylidene chloride, either alone or mixed with substances polymerizable therewith, such as vinyl chloride, and acrylonitrile, it is understood that the method is applicable to any polymerization of a liquid polymerizable substance which may be carried out in water suspension to produce a solid polymer. Such polymerization, which includes the polymerization of vinyl chloride, vinyl acetate, vinyl butyrate, styrene, acrylic and methacrylic esters, and mixtures thereof in addition to vinylidene chloride invariably involve the occurrence during the polymerization of a sticky, viscous, agglomerative mass which leads to unsatisfactory results unless the herein described method of carrying out the polymerization is used.

I claim:

1. In a method of polymerizing a monomeric substance from the group consisting of vinylidene chloride, vinyl chloride, styrene, vinyl acetate, vinyl butyrate, acrylic esters, methacrylic esters, acrylonitrile, mixtures of vinylidene chloride and vinyl chloride and mixtures of vinylidene chloride and acrylonitrile, the polymerization of which in an aqueous suspension of macroparticles and without the use of emulsifiers is normally characterized by the transition of the suspended particles from a liquid state to a sticky, semi-liquid agglomerative state to a hard granular state, the steps which include: supplying such a water suspension of the monomer continuously to an initial zone at a temperature known to induce polymerization of the monomer, with sufficient agitation to insure thorough mixing of the monomer with the suspension medium, for so long as most of the suspended macroparticles remain liquid and until solid particles begin to appear; displacing continuously from said initial zone a volume of suspension of liquid partial polymer equal to the volume of monomer suspension being supplied thereto; conducting the suspension of predominantly liquid particles from the said first zone into a second zone, isolated from the first, wherein agitation is maintained at a rate greater than that in the first said zone to keep the particles from agglomerating and coalescing to any appreciable extent, the said second zone likewise being at a temperature known to induce polymerization, retaining the suspension in the said second zone while the suspended particles pass from a predominantly liquid to a sticky and agglomerative state and thence to a substantially non-sticky granular condition in their normal process of polymerization; displacing continuously from said second zone a volume of suspension of granular partial polymer equal to the volume of liquid polymer suspension fed thereto; conducting the suspension into a third and final zone after the said non-sticky granular state has been attained but before the amount of monomer in the granules has been reduced below 40 per cent by weight, and continuing the polymerization in the said final zone at a polymerization temperature, with sufficient agitation to maintain suspension but which is less than those used in the first and second said zones and is insufficient to grind the suspended particles to a fine powder, until the desired degree of polymerization is attained; and finally recovering the granular polymer of substantially uniform particle size and composition continuously from the third said zone.

2. The method as claimed in claim 1, wherein the principal monomer in the aqueous suspension subjected to polymerization is vinylidene chloride.

ROBERT C. REINHARDT.

REFERENCES CITED

The following references are of record in the file of this patent:

UNITED STATES PATENTS

| Number | Name | Date |
|---|---|---|
| 2,108,044 | Crawford et al. | Feb. 15, 1938 |
| 2,259,180 | Schoenfeld et al. | Oct. 14, 1941 |
| 2,348,154 | Scott et al. | May 2, 1944 |
| 2,363,951 | Fikentscher | Nov. 28, 1944 |
| 2,380,009 | Arnold et al. | July 10, 1945 |